US00RE37874E

(19) United States
(12) Reissued Patent
Pawlowski, Jr. et al.

(10) Patent Number: US RE37,874 E
(45) Date of Reissued Patent: Oct. 15, 2002

(54) OFF-AXIS INK WITH SUPPLY WITH PRESSURIZED INK TUBE FOR PREVENTING AIR INGESTION

(75) Inventors: Norman E. Pawlowski, Jr., Corvallis, OR (US); Paul D. Gast, Vancouver, WA (US)

(73) Assignee: Hewlett-Packard Company, Palo Alto, CA (US)

(21) Appl. No.: 09/609,450

(22) Filed: Jun. 27, 2000

Related U.S. Patent Documents

Reissue of:
(64) Patent No.: 5,988,802
Issued: Nov. 23, 1999
Appl. No.: 08/706,052
Filed: Aug. 30, 1996

(51) Int. Cl.[7] ..... B41J 2/175
(52) U.S. Cl. ..... 347/86
(58) Field of Search ..... 347/84, 85, 86, 347/87, 17

(56) References Cited

U.S. PATENT DOCUMENTS

| | | | | | |
|---|---|---|---|---|---|
| 3,805,276 | A | * | 4/1974 | Ishii | 347/85 |
| 4,514,742 | A | * | 4/1985 | Suga et al. | 347/85 |
| 4,558,326 | A | * | 12/1985 | Kimura et al. | 347/86 |
| 4,630,077 | A | * | 12/1986 | Berruti et al. | 347/86 |
| 4,777,497 | A | * | 10/1988 | Nozu et al. | 347/68 |
| 5,367,328 | A | * | 11/1994 | Erickson | 347/7 |
| 5,369,429 | A | * | 11/1994 | Erickson | 347/7 |
| 5,469,201 | A | * | 11/1995 | Erickson et al. | 347/85 |
| 5,552,815 | A | * | 9/1996 | Shimoda | 347/85 |

FOREIGN PATENT DOCUMENTS

| | | | | |
|---|---|---|---|---|
| EP | 0 508 125 A2 | * | 10/1992 | B41J/2/175 |
| EP | 0 529 880 A2 | * | 3/1993 | B41J/2/175 |
| EP | 0 699 533 A2 | * | 3/1996 | B41J/2/175 |
| EP | 0 709 207 A2 | * | 5/1996 | B41J/2/175 |
| JP | 62-288045 | * | 12/1987 | 347/85 |
| JP | 63-15752 | * | 1/1988 | |
| JP | 6-31930 | * | 2/1994 | 347/86 |
| JP | 08058085 | * | 5/1996 | B41J/2/045 |

OTHER PUBLICATIONS

Webster's II New Riverside University Dictionary, p. 932, 1994.*

* cited by examiner

*Primary Examiner*—Judy Nguyen

(57) ABSTRACT

In the preferred embodiment, an inkjet printer includes a replaceable print cartridge which is inserted into a scanning carriage. The print cartridge contains a regulator valve. An ink tube extends from the scanning carriage to a separate, disposable ink supply cartridge located within the printer. A second valve connected between the ink tube and the ink supply cartridge is automatically actuated when it is determined that the printer is not being used. The valve seal is more reliable than the inexpensive one-way valve seal in the disposable ink supply cartridge. The reliable valve seal prevents any air bubbles in the tube from expanding toward the ink supply cartridge, enabling the use of more flexible tubes which have less stringent air diffusion characteristics. In another embodiment, instead of a valve, a pressure source is connected to the ink tube to maintain the partial air pressure within the tube at approximately ambient pressure.

29 Claims, 14 Drawing Sheets

OFF-AXIS INK WITH SUPPLY WITH PRESSURIZED INK TUBE FOR PREVENTING AIR INGESTION

Matter enclosed in heavy brackets [ ] appears in the original patent but forms no part of this reissue specification; matter printed in italics indicates the additions made by reissue.

FIELD OF THE INVENTION

This invention relates to inkjet printers and, more particularly, to an inkjet printer having a scanning printhead with a stationary ink supply.

BACKGROUND OF THE INVENTION

Inkjet printers are well known. One common type of inkjet printer uses a replaceable print cartridge which contains a printhead and a supply of ink contained within the print cartridge. The print cartridge is not intended to be refillable and, when the initial supply of ink is depleted, the print cartridge is disposed of and a new print cartridge is installed within the scanning carriage. Frequent replacement of the print cartridge results in a relatively high operating cost.

The printhead has a useable life which is significantly longer than the time it takes to deplete the ink within the print cartridge. It is known to refill print cartridges intermittently by creating an opening through the print cartridge and manually refilling the print cartridge with ink. However, these refilling methods require manipulation by the user and are undesirable for various other reasons.

It is also known to provide an external, stationary ink reservoir, such as a flaccid bag containing ink, connected to the scanning print cartridge via a tube; however, these types of printing systems have various drawbacks including undesirable fluctuations in ink pressure in the print cartridge, an unreliable and complex fluid seal between the print cartridge and the external ink supply, increased printer size due to the external ink supply's connection to the print cartridge, blockage in the ink delivery system, air accumulation in the tubes leading to the print cartridge, leakage of ink, high cost, and complexity. Such external ink supplies are referred to as off-axis ink supplies.

Most relevant to the present disclosure, Applicants have discovered that there is a diffusion mechanism that has the effect of growing bubbles and even pressurizing the ink delivery system. A bubble in the tubing has 100% relative humidity inside. Typically, the tube is in fluid communication with a flaccid bag containing ink. Thus, the pressure in the bubble is equalized with atmospheric pressure. In most environments, ambient humidity is less than 100%. Since the total pressure in the tube is the sum of the partial pressures, the partial pressure of air in the tube is less than the partial pressure of ambient air. As can be seen, this pressure difference decreases to zero as the ambient humidity approaches 100%. Thus, this pressure difference tends to be greatest in regions like Arizona and least for regions like Florida. As a result, rapid diffusion of air into the tube occurs, growing the bubble. In hot dry environments, some tubes (depending on their material, diameter, and thickness) can fill with air within a few days.

Excessive air in the tube will eventually be drawn into the printhead. Air in the printhead will render non-functional any pressure regulator internal to, or leading to, the print cartridge. For a non-pressurized ink supply system, excessive air delivered by the tubes will also cause printhead starvation.

What is needed is an improved inkjet printer, with a print cartridge and a separate ink delivery system connected to the print cartridge via one or more tubes, which avoids the air accumulation problems described above.

SUMMARY

In the preferred embodiment, an inkjet printer includes a replaceable print cartridge which is inserted into a scanning carriage. An ink tube extends from the scanning carriage to a separate ink supply located within the printer. The external ink supply may be constantly pressurized, intermittently pressurized, or non-pressurized.

A separate valve between the tube(s) and the ink supply ensures that the pressure inside the tube will be substantially the same as ambient pressure. This minimizes water loss and air ingestion into the tube. This also prevents any expansion of air in the tube from reaching the ink supply. This valve is automatically actuated when it is detected that the printer is not being used.

If the print cartridge does not include a regulator valve, a second valve is inserted between the print cartridge and the tube so that the tube is sealed at its end by two valves when the printer is not being used.

Instead of a valve between the ink supply and the tube, the tube may be pressurized by a positive pressure source.

DETAILED DESCRIPTION OF THE PREFERRED EMBODIMENTS

Figure 1:
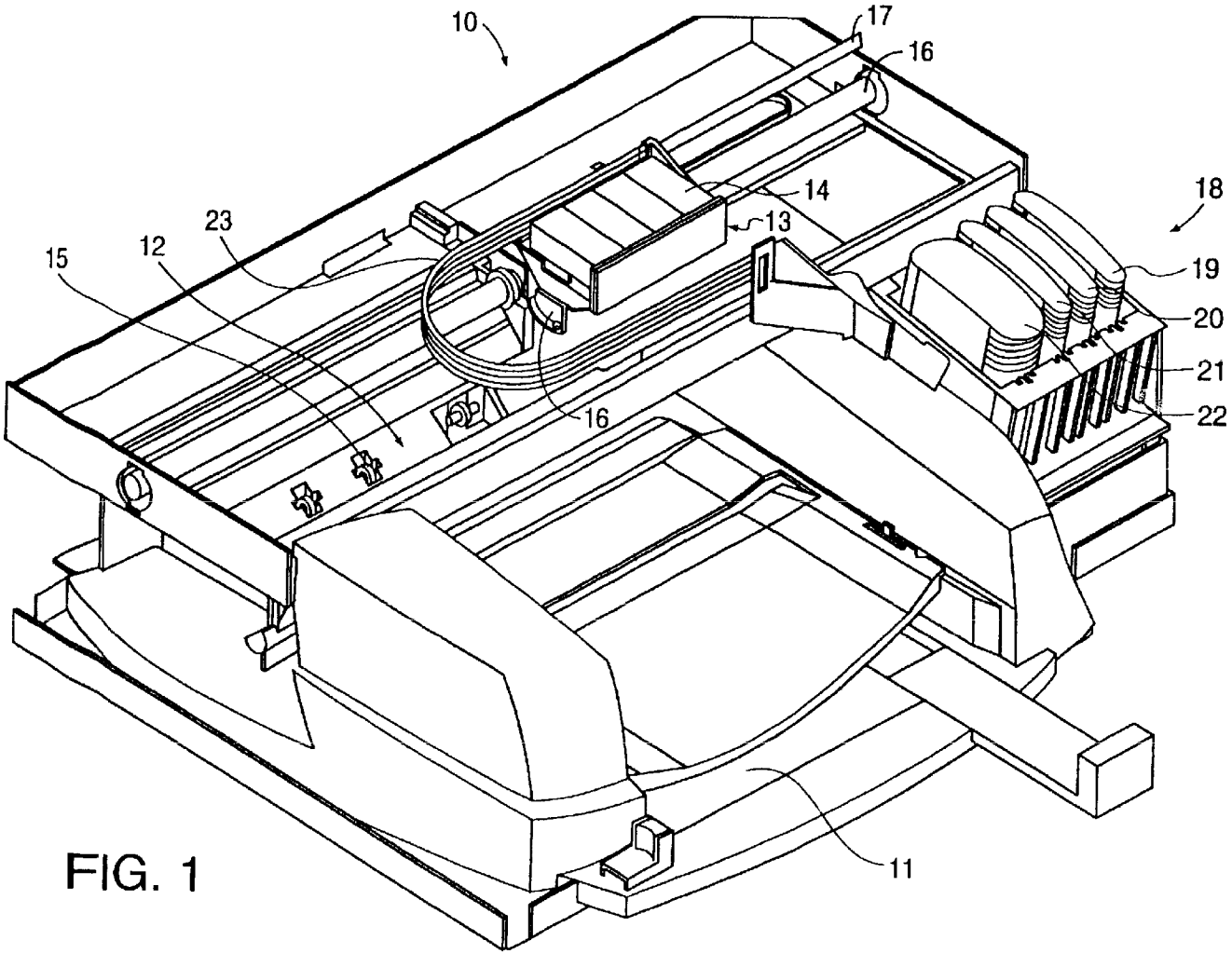
FIG. 1 is a perspective view of one embodiment of an inkjet printer incorporating the present invention.

FIG. 1 is a perspective view of one embodiment of an inkjet printer 10, with its cover removed, incorporating various inventive features. Generally, printer 10 includes a tray 11 for holding virgin paper. When a printing operation is initiated, a sheet of paper from tray 11 is fed into printer 10 using a sheet feeder, then brought around in a U direction to now travel in the opposite direction toward tray 11. The sheet is stopped in a print zone 12, and a scanning carriage 13, containing one or more print cartridges 14, is then scanned across the sheet for printing a swath of ink thereon.

After a single scan or multiple scans, the sheet is then incrementally shifted using a conventional stepper motor and feed rollers 15 to a next position within print zone 12, and carriage 13 again scans across the sheet for printing a next swath of ink. When the printing on the sheet is complete, the sheet is forwarded to a position above tray 11, held in that position to ensure the ink is dry, and then released.

Alternative embodiment printers include those with an output tray located at the back of printer 10, where the sheet of paper is fed through the print zone 12 without being fed back in a U direction.

The carriage 13 scanning mechanism may be conventional and generally includes a slide rod 16, along which carriage 13 slides, and a coded strip 17 which is optically detected by a photodetector in carriage 13 for precisely positioning carriage 13. A stepper motor (not shown), connected to carriage 13 using a conventional drive belt and pulley arrangement, is used for transporting carriage 13 across print zone 12.

The novel features of inkjet printer 10 and the other inkjet printers described in this specification relate to the ink delivery system for providing ink to the print cartridges 14 and ultimately to the ink ejection chambers in the printheads. This ink delivery system includes an off-axis ink supply station 18 containing replaceable ink supply cartridges 19, 20, 21, and 22, which may be pressurized or at atmospheric pressure. For color printers, there will typically be a separate ink supply cartridge for black ink, yellow ink, magenta ink, and cyan ink.

Four tubes 23 carry ink from the four replaceable ink supply cartridges 19–22 to the four print cartridges 14.

Elements throughout the various figures identified with the same numerals may be identical.

Figure 2:
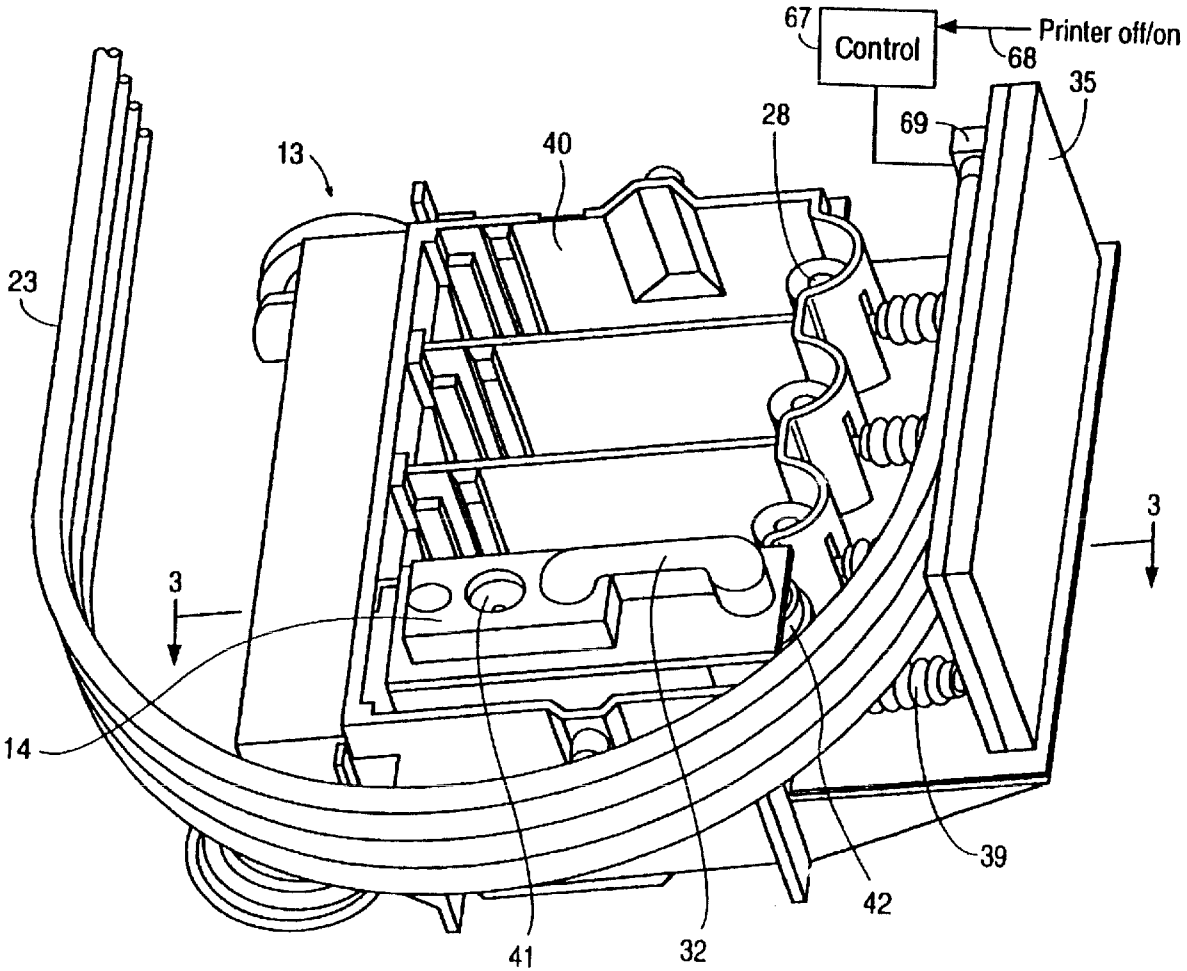
FIG. 2 is a perspective view looking down on a carriage with one print cartridge installed.

FIG. 2 is a perspective view looking down at carriage 13, showing print cartridge 14 and septum 28.

Figure 3:
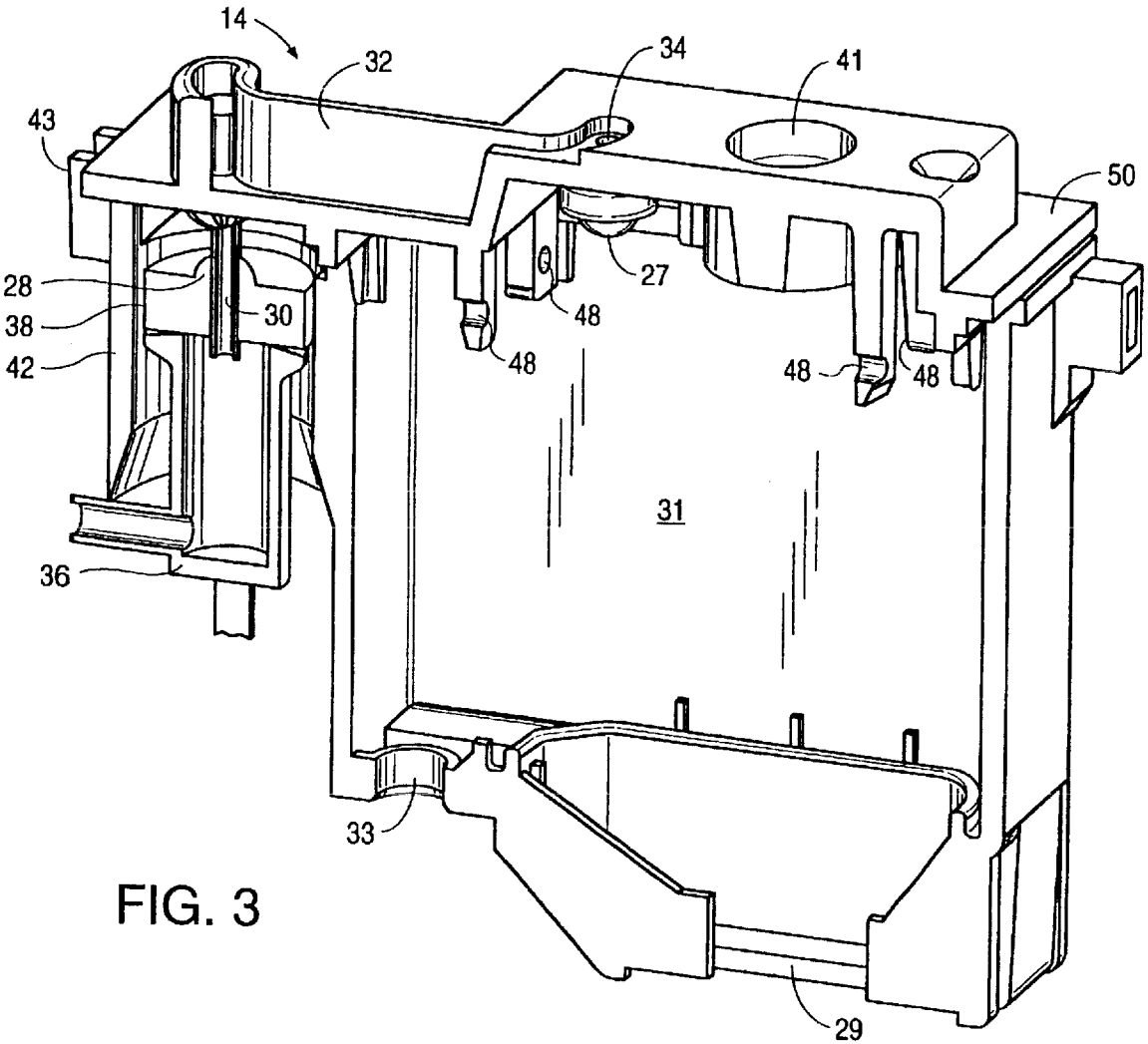
FIG. 3 is a cross-sectional view of the print cartridge of FIG. 2, along line 3—3, connected to the fluid interconnect on the carriage.

FIG. 3 is a cross-sectional view of print cartridge 14 along line 3—3 in FIG. 2. An opening in the bottom of carriage 13 exposes the printhead location 29 (FIG. 3) of each print cartridge 14. Carriage electrodes oppose contact pads located on print cartridge 14.

When a regulator valve 27 (FIG. 3) internal to print cartridge 14 is opened, a hollow needle 30 is in fluid communication with an ink chamber 31 internal to print cartridge 14. The hollow needle 30 extends through a self-sealing slit formed through the center of septum 28. This self-sealing slit is automatically sealed by the resiliency of the rubber septum 28 when needle 30 is removed.

A plastic ink conduit 32 (shown in FIG. 3 with its cover removed) leads from needle 30 to ink chamber 31 via hole 34 (FIG. 3). An initial ink fill hole 33 is used to initially fill ink chamber 31 and is then permanently sealed with a stopper.

Ink is provided to carriage 13 by tubes 23 (FIG. 2), formed of Polyvinylidene Chloride (PVDC), such as Saran™, or other suitable plastic, which connect to a plastic manifold 35. Manifold 35 provides several 90° redirections of ink flow. Such a manifold 35 may not be needed if tubes 23 are sufficiently slender and can be bent without buckling. A pressurized (or intermittently pressurized) off-axis ink supply (described later) may utilize such slender tubing. In the preferred embodiment, non-pressurized ink tubes 23 have an internal diameter between approximately 1.5–2.5 mm, while pressurized ink tubes 23 have an internal diameter between approximately 1–1.5 mm.

A septum elbow 36 (FIG. 3) routes ink from manifold 35 to septum 28 and supports septum 28. Septum 28 is affixed to elbow 36 using a crimp cap 38.

A flexible bellows 39 (FIG. 2) is provided for each of the individual stalls 40 in carriage 13 for allowing a degree of x, y, and z movement of septum 28 when needle 30 is inserted into septum 28 to minimize the x, y, and z load on needle 30 and ensure a fluid-tight and air-tight seal around needle 30. Bellows 39 may be formed of butyl rubber, high acn nitrile or other flexible material having low vapor and air transmission properties. Alternatively, bellows 39 can be replaced with a U-shaped or circular flexible tube.

An air vent 41 formed in the top of print cartridge 14 is used by a pressure regulator in print cartridge 14, described with respect to FIGS. 4–7C and more fully in U.S. application Ser. No. 08/550,902, filed Oct. 31, 1995, now U.S. Pat. No. 5,872,584 entitled "Apparatus for Providing Ink to an Ink-Jet Print Head and for Compensating for Entrapped Air," by Norman Pawlowski, Jr. et al., attorney docket no. 1094910, incorporated herein by reference. The internal regulator causes there to be a slight negative pressure (e.g., −2 to −6 inches of water column) in ink chamber 31. In an alternative embodiment, a separate regulator may be connected between the off-axis ink supply and each print cartridge 14.

If desired, the print cartridges can be secured within the scanning carriage by individual latches, which may be manually operated or spring loaded, where the latches press down on a tab or a corner of the print cartridge. In another embodiment, a single latch, such as a hinged bar, secures all four print cartridges in place within the carriage.

A shroud 42 surrounds needle 30 to prevent inadvertent contact with needle 30 and also to help align septum 28 with needle 30 when installing print cartridge 14 in carriage 13. Ink flows through needle 30 into print cartridge 14 due to the pressure differential between the ink in the tube 23 and the internal ink reservoir.

Coded tabs 43 align with coded slots in the carriage stalls 40 to ensure the proper color print cartridge 14 is placed in the proper stall 40. In an alternative embodiment, needle 30 is part of a separate subassembly, and shroud 42 is a separate subassembly, for manufacturing ease and to allow color key changing by changing the shroud, assuming the color key tabs are located on the shroud.

The printhead assembly, which is affixed at location 29 in FIG. 3, is preferably a flexible polymer tape having nozzles formed therein by laser ablation. Conductors are formed on the back of tape and terminate in contact pads for contacting electrodes on carriage 13. The other ends of the conductors are bonded through windows in the tape to terminals of a substrate on which are formed the various ink ejection chambers and ink ejection elements. The ink ejection elements may be heater resistors or piezoelectric elements. The printhead assembly may be similar to that described in U.S. Pat. No. 5,278,584, by Brian Keefe et al., entitled "Ink Delivery System for an Inkjet Printhead," assigned to the present assignee and incorporated herein by reference. In such a printhead assembly, ink within the print cartridge flows around the edges of the rectangular substrate and into ink channels leading to each of the ink ejection chambers.

The print cartridges and ink supply connections described thus far are down-connect types, where the ink connection is made when pressing the print cartridge 14 down into the carriage 13. This enables a resulting printer to have a very low profile. The needle 30 extending from the print cartridge 14 may be replaced with a septum, and the septum 28 on the scanning carriage 13 replaced with a hollow needle.

FIGS. 4–7C describe a pressure regulator 45 which may be used within any of the print cartridge embodiments described herein for regulating the pressure of the ink chamber within the print cartridge. Hence, the pressure in the off-axis ink supply system may be unregulated. The regulator causes the ink chamber within the print cartridge to have a slight, but substantially constant, negative pressure (e.g., −2 to −7 inches of water column) to prevent ink drool from the nozzles of the printhead. If the off-axis ink supply system is at atmospheric pressure, this slight negative pressure in the print cartridge also acts to draw ink from the off-axis ink supply system even if the location of the ink supply system is slightly below the print cartridge. The regulator also enables the use of pressurized off-axis ink supplies while maintaining the desired negative pressure within the ink chamber in the print cartridge. The regulator can be designed to provide a wide range of negative pressures (or back pressures) from 0 to −50 inches of water column, depending on the design of the printhead.

Figure 4:
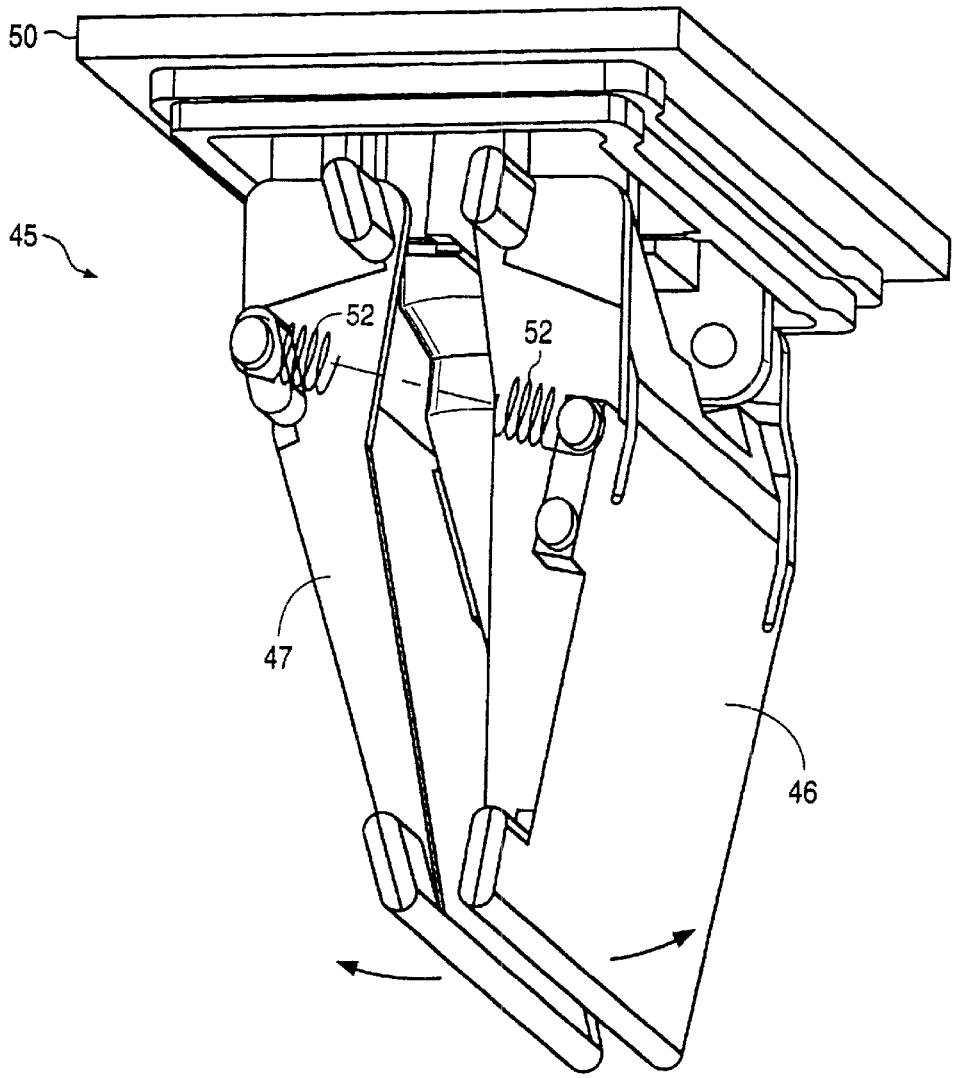
FIG. 4 illustrates an ink pressure regulator internal to the print cartridge of FIG. 3, which opens and closes an ink valve.

FIG. 4 illustrates the regulator portion of the print cartridge without its inflatable air bag (to be described later) in order to better understand the operation of the regulator 45. The regulator contains a pressure regulator lever 46 and an accumulator lever 47. Levers 46 and 47 pivot on pivot pins inserted into holes 48 (FIG. 3) formed in support portions on the top section 50 (FIG. 4) of the print cartridge housing. The top section 50 of the cartridge housing in FIG. 4 is simplified to not illustrate the ink interconnect, which includes needle 30 and shroud 42, in order to better reveal the regulator 45.

Figure 7A:
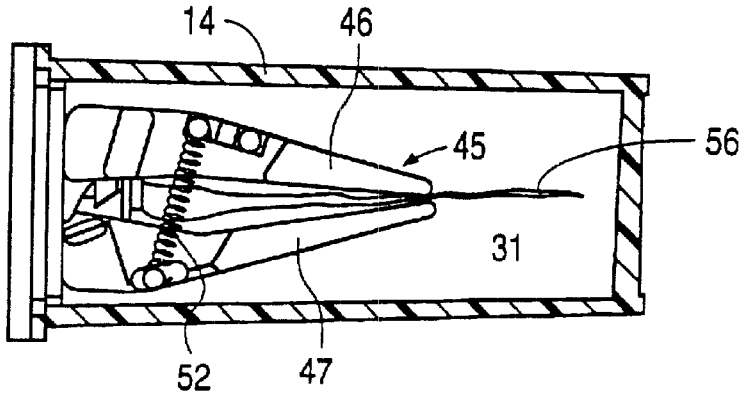
FIGS. 7A, 7B, and 7C illustrate the operation of the pressure regulator in opening and closing the ink valve.
Figure 7B:
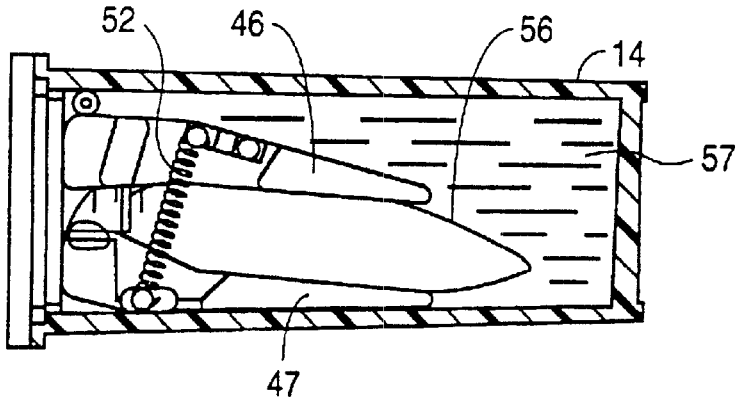
Figure 7C:
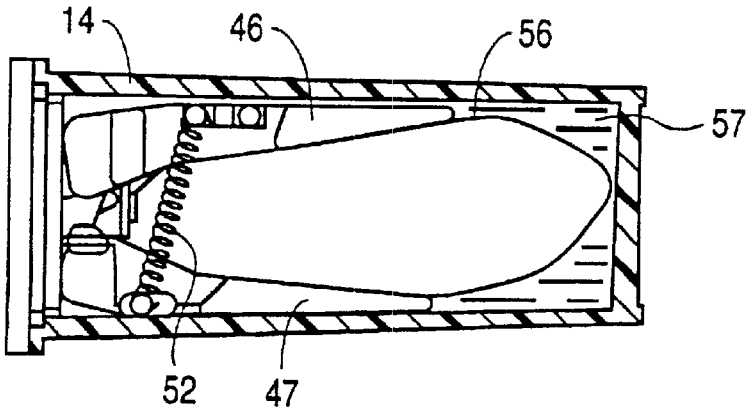

An air vent 41 (FIG. 3) leads to an air bag (not shown in FIG. 4 but illustrated in FIGS. 7A–7C). As will be described with respect to FIGS. 7A–7C, as the air bag inflates due to the ink pressure within the print cartridge becoming more negative, the levers 46 and 47 expand outward to overcome the spring force provided by spring 52. The regulator lever 46 includes a valve seat 54 which mates with the regulator inlet valve 27 when lever 46 is in its closed position. When lever 46 is expanded outward, ink is allowed to enter the ink chamber of the print cartridge to reduce the negative ink pressure to thus collapse the air bag and again close the valve 27.

Figure 5:
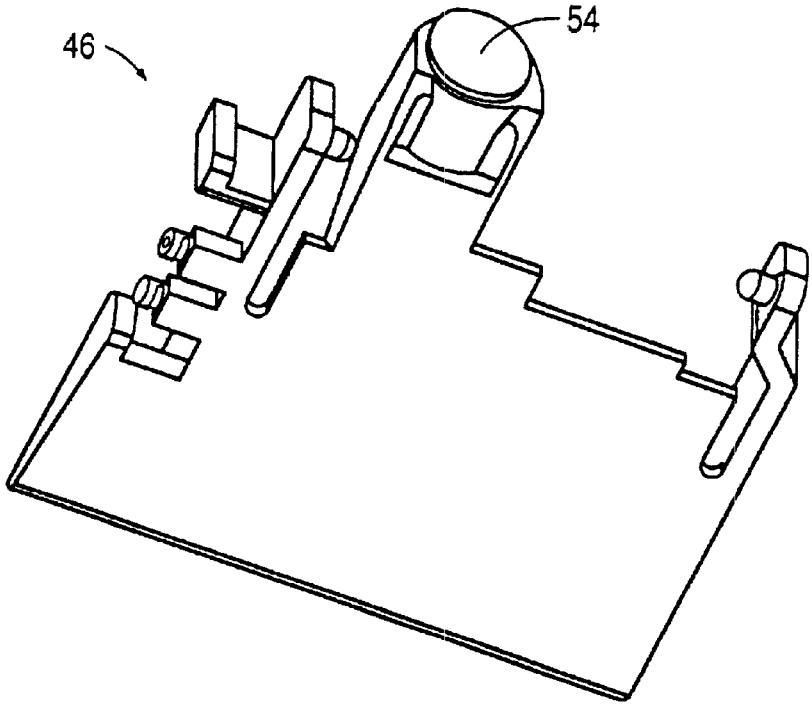
FIGS. 5 and 6 illustrate two sides of a pivoted lever in FIG. 4.
Figure 6:
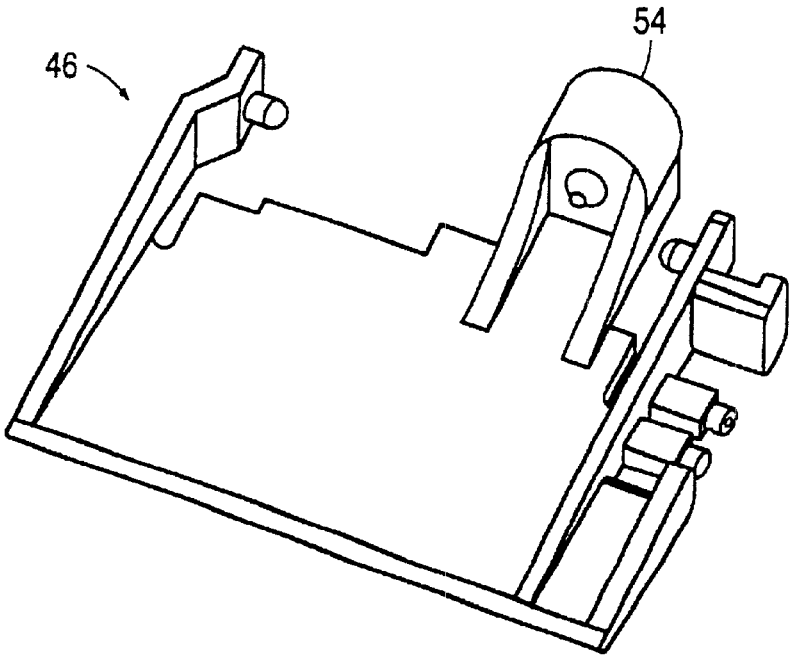

FIG. 5 is a perspective view of the regulator lever 46 showing its outer side, and FIG. 6 is a perspective view of the regulator lever 46 showing its inner side.

FIGS. 7A–7C illustrate the operation of regulator 45 under various conditions. The accumulator lever 47 and the air bag 56 operate together to accommodate changes in volume due to any air that may be entrapped in the print cartridge body, as well as due to any other pressure changes. The accumulator lever 47 acts to modulate any fluctuations in the back pressure. The accumulator lever 47 squeezes the bag 56, the inside of which is at ambient pressure, forces air out of the bag, and allows trapped air in the print cartridge to expand. The spring 52 is connected to the accumulator lever 47 close to its axis of rotation to cause the accumulator lever 47 to actuate before the regulator lever 46 moves.

FIG. 7A illustrates the print cartridge 14 with one side open to reveal the regulator 45. FIG. 7A illustrates the initial condition of the print cartridge 14, where there is no ink within the ink chamber 31, and the air bag 56 is limp. The back pressure in ink chamber 31 equals the ambient pressure, and spring 52 urges the two levers 46 and 47 fully together.

When the print cartridge is installed in carriage 13 and the hollow needle 30 (FIG. 3) of the print cartridge receives ink from the ink tube 23, a vacuum is drawn on the printhead nozzles by a service station in the printer. Such service stations are well known and create a seal over the nozzles while applying a vacuum. In response to this vacuum, the accumulator lever 47 moves first, and the bag 56 begins to expand as shown in FIG. 7B. The accumulator lever 47 continues to rotate about its axis of rotation until it engages a side wall of the print cartridge body as shown in FIG. 7B. At this point, the regulator lever 46 begins to move outwardly, and ink 57 begins to enter the ink chamber 31 through the inlet valve 27 (FIG. 4).

FIG. 7C illustrates the full-open position of the ink inlet valve 27 to provide maximum ink flow into the print cartridge. The position of the regulator lever 46 depends on the speed of printing.

Once the ink chamber 31 is filled with ink or printing has stopped, the regulator lever 46 will close valve 27 (FIG. 4) at the urging of the spring 52, and the levers 46 and 47 will return to the state illustrated in FIG. 7B.

Figure 8:
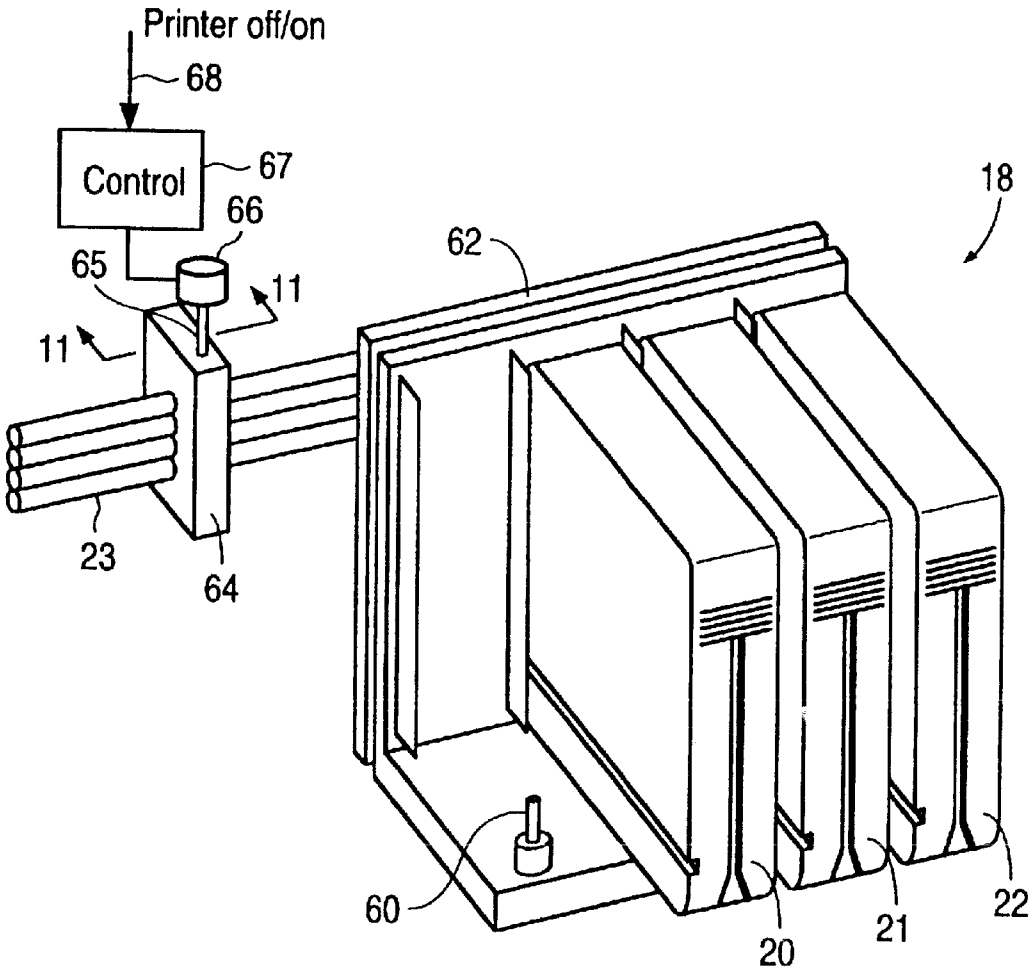
FIG. 8 illustrates an ink supply station having ink supply cartridges installed therein, with a valve between the ink tubes and the ink supply cartridges in accordance with one embodiment of the invention.

FIG. 8 is a perspective view of an ink supply station 18. In the particular embodiment shown in FIG. 8, only three out of the four color ink supply cartridges 20, 21, and 22 are installed in the ink supply station 18. A hollow needle 60 extending from a stall in the ink supply station 18 is in fluid communication with one of tubes 23, which is in turn connected to one of the print cartridges 14. The ink within each of ink supply cartridges 20–22 is at atmospheric pressure, and ink is drawn into each of print cartridges 14 by a negative pressure within each print cartridge 14 determined by a regulator 45 internal to each print cartridge. A spring-loaded humidor (not shown) around needle 60 has a rubber portion which covers a side hole at the end of needle 60 when an ink supply cartridge 20–22 is removed. A plastic elbow or manifold 62 redirects ink from needle 60.

In another embodiment, to be described later, the off-axis ink supply cartridges are intermittently pressurized. In both the pressurized and unpressurized ink supply embodiments, the regulator internal to each print cartridge regulates the pressure of ink supplied to the print cartridge.

A separate valve 64 is connected between tubes 23 and the ink supply station 18. Valve 64 may also form part of ink supply station 18. Valve 64 may be any type of suitable valve which provides a highly reliable fluid seal of the tubes 23 when in a closed position. Valve 64 is placed in a closed position by the rotation of a motor shaft 65 or other means when motor 66 is controlled to be in a closed position by a control circuit 67. Control circuit 67 senses when the printer is turned off (or otherwise not being used) and simply provides a control voltage to motor 66 necessary to close valve 64. Conversely, when the printer is turned on or otherwise ready for use, control circuit 67 provides a signal to motor 66 to open valve 64 to allow tubes 23 to communicate with the ink supply station 18. Control circuit 67 may be a simple latch or switch which is set and reset by a printer off/on signal 68.

The purpose of valve 64 is to create a constant volume condition within tube 23 to assure that the partial pressure of any air bubbles (composed primarily of oxygen and nitrogen) in tube 23 will be no less than the ambient pressure of air outside the tubes 23 during periods of printer non-use. The valve's 64 main function is to limit air ingestion into tubes 23.

In one embodiment of an inkjet printer, a one-way flapper valve in the ink supply cartridge attempts to prevent a back flow of ink from tubes 23 into the ink supply cartridges. Any one-way valves, such as flapper valves, in the ink supply cartridges 20–22 are passive (not electrically actuated) and inexpensive in order for it to be viable to dispose of the ink supply cartridge when depleted. Such a flapper valve has a very low level of seepage and is only capable of holding back larger ink pressures for only short durations. Hence, such a flapper valve cannot take the place of valve 64.

Air ingestion through tubes 23 occurs over relatively long periods of time and is chiefly a concern when the printer experiences long periods of non-use. Air ingestion involves the growth of bubbles that are pre-existing in a tube 23, which may fluidically connect a flaccid bag containing ink releasably mounted in the fixed supply station 18 with the print cartridge 14 that scans with carriage 13. The bubbles in tube 23 are in pressure equilibrium (i.e., approximately equal total pressure) with the ambient atmosphere. However, the relative humidity in the bubbles is roughly 100%, which is normally much higher than the humidity of ambient air. Since the total pressures are roughly equal, and since the total pressure of a gas is the sum of its partial pressures, the partial pressure of air in the bubble is normally lower than that of ambient air. This partial pressure difference is even greater for dry environments, such as those found in Arizona. Therefore, air will diffuse into the bubble from outside air through the tube 23 with the rate of diffusion in proportion to this partial pressure difference. If polyethylene tubing is used in a hot and dry environment like Arizona in summer, a bubble can expand and fill the tubing within days. This is quantitatively expressed as follows:

$$P_{\text{total tube}} = P_{\text{total bag}} = P_{\text{total outside}}$$

$$P_{\text{total tube}} = P_{\text{air, tube}} + P_{\text{vapor, tube}}$$

$$= P_{\text{air, outside}} + P_{\text{vapor, outside}}$$

$$\text{Thus, } (P_{\text{air, outside}} - P_{\text{air, tube}}) = (P_{\text{vapor, tube}} - P_{\text{vapor, outside}})$$

As can be seen, the difference in vapor pressures is proportional to the rate of diffusion of air from outside into the bubble. The vapor pressure inside the tube 23 increases with temperature, and is based upon vapor pressure tables (which assume 100% relative humidity).

Another source of problems is water diffusing out of the tubing. There are many tubing materials, such as FEP, that do not have a water diffusion issue, but there are very few that have low air diffusion rates. So far, PCTFE and Polyvinylidene Chloride (PVDC) tubing materials appear preferable from an air diffusion standpoint. However, these materials are expensive or hard to acquire with the properties required.

With a check valve between the tube 23 and the printhead that limits air growth in that direction, the air will expand toward and into the ink supply. Eventually, the ink bag pressure will reach the ink vapor pressure. In a warm environment, this can cause the bag to burst, spilling ink into the printer. In any event, air in the tubes 23 will eventually be drawn into the printhead. This can render the regulator nonfunctional, causing ink drooling and printer damage during warm periods. In addition, the air can cause ink starvation in the printhead.

If the print cartridge has a regulator which incorporates a valve to block the print cartridge's ink inlet (ink valve 27 in FIG. 3), air expands in the tube in the direction toward the ink supply station.

If the valve 64 is added just after the ink supply station or in the ink supply station itself, then any trapped air in the tubing will not be able to expand since there will be no ink seepage back into the ink supply cartridge. The equilibrium pressure will be roughly equal to the vapor pressure of the ink, and, therefore, in order for the bubble of air to grow, ink must leave the system or the system itself must expand. Hence, the air bubble growth becomes equal to the rate of fluid loss, which is easy to control with the proper tubing material.

The addition of the valve 64 enables the use of a broader range of materials for forming tubes 23. Hence, the material used to form tubes 23 may be selected based upon attributes such as flexibility, bend radii, and fatigue life rather than based upon its air permeability. This also allows the use of a lower cost tube and a resulting smaller system.

Valve 64 also provides added protection against ink leaks between the ink supply cartridge and the ink supply station. The print cartridge life is also increased since there is less air entering the print cartridge body. For printers which do not have a pressure regulator between the ink supply station and the scanning print cartridge, another valve would be connected between tubes 23 and carriage 13 (or just prior to the print cartridge) to prevent ink seeping into the print cartridge. Such a valve 69 is illustrated in FIG. 2, where valve 69 is connected between tubes 23 and manifold 35. Valve 69 may be a rotary valve, which is actuated by a motor or other actuator as described with respect to valve 64 in FIG. 8.

Figure 9:
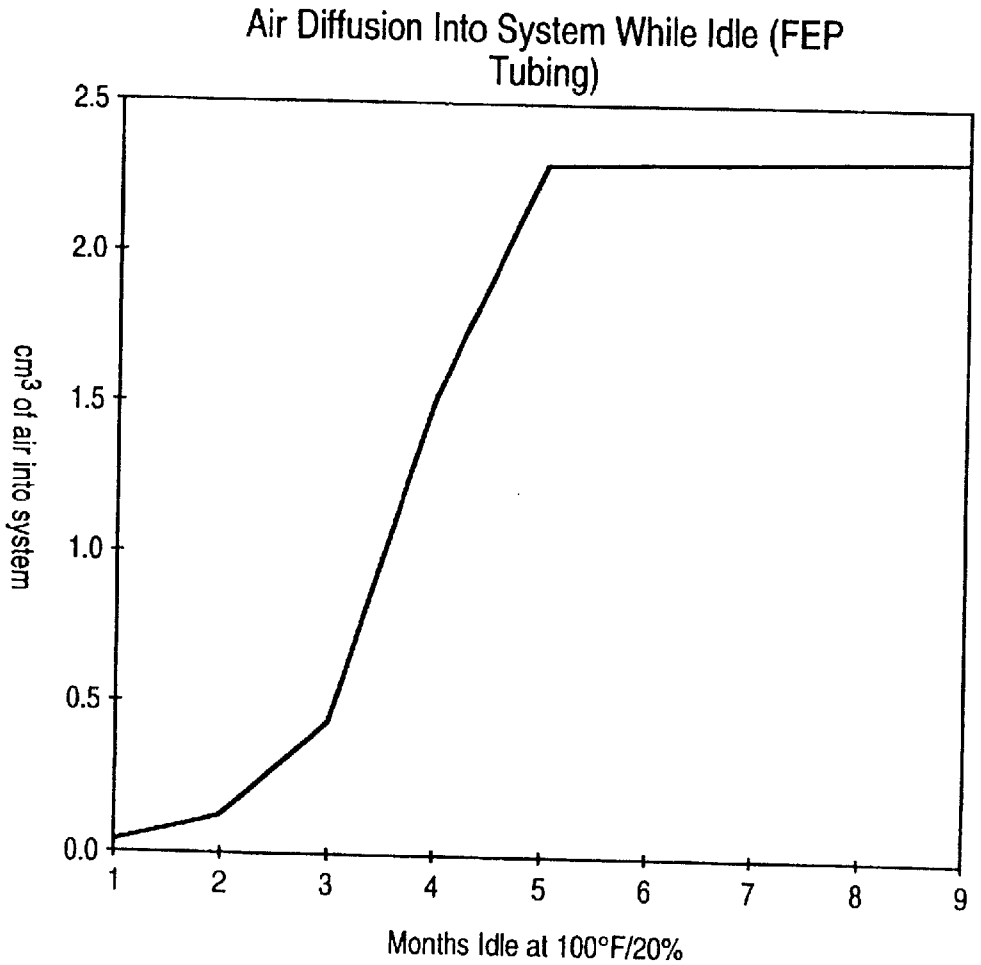
FIG. 9 is a graph of air diffusion into the tubes versus time.

FIG. 9 illustrates the air diffusion (in cubic centimeters of air) into the tubing versus time while the printer is idle, assuming FEP tubing. As seen, a significant amount of air begins entering the system starting at the three month period.

Figure 10:
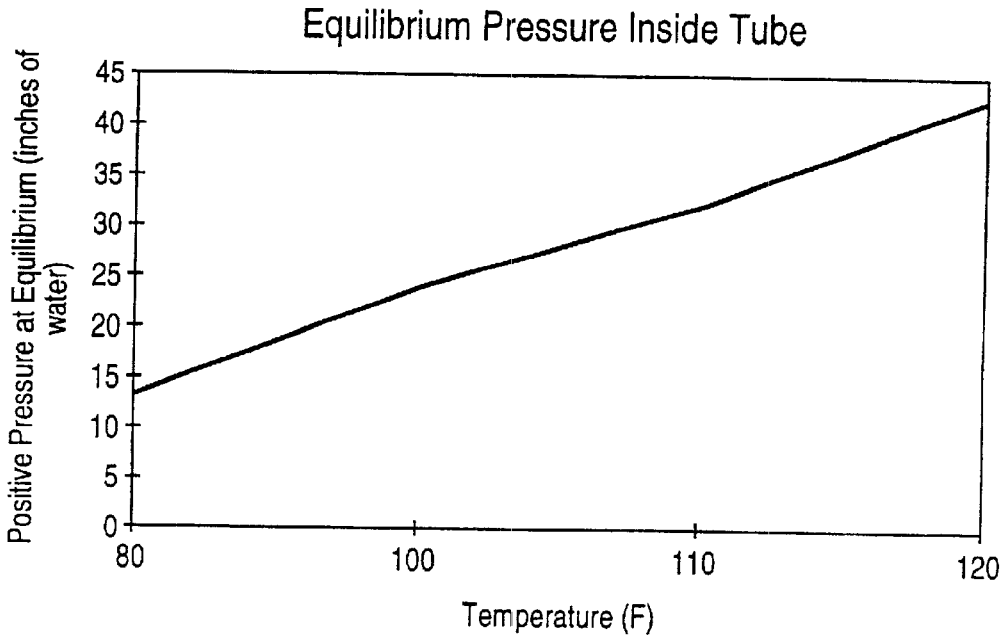
FIG. 10 is a graph of air pressure at equilibrium internal to the tube versus temperature.

FIG. 10 illustrates the increase in equilibrium pressure (in inches of water) inside the tube (assuming a constant volume inside the tube) as the temperature rises. This assumes a perfect seal at the print cartridge and ink supply station. Such an increase in the air pressure within the tube will expand the air within the tube.

Figure 11A:
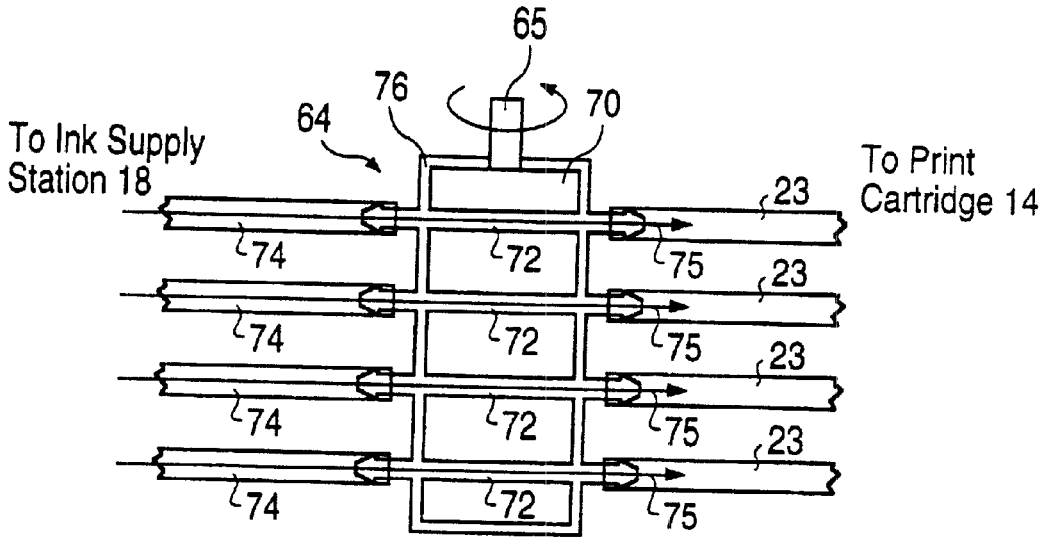
FIGS. 11A and 11B are cross-sectional views of the valve of FIG. 8, along line 11—11, connecting the tubes to the ink supply station.
Figure 11B:
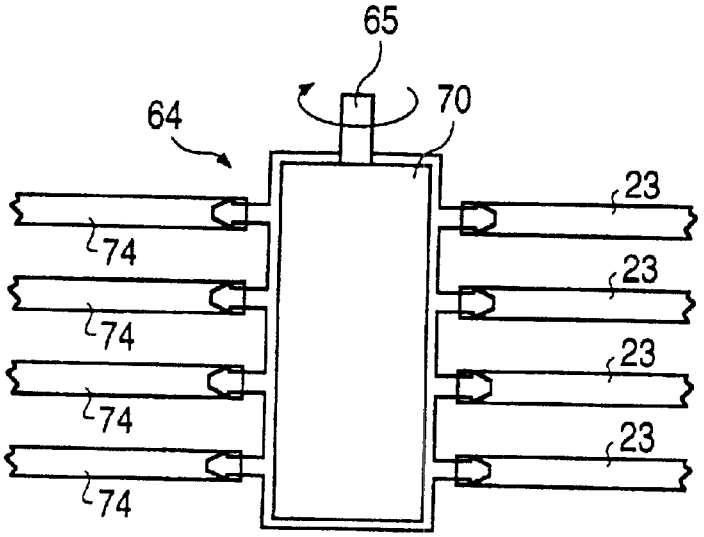

FIGS. 11A and 11B provide additional detail of one embodiment of valve 64, although valve 64 may be virtually any type of valve which provides a highly reliable seal and which may be activated when the printer is switched on or off or when it is determined that a printing operation has ceased or has begun.

FIG. 11A shows a bisected valve 64 in an open position, along line 11—11 in FIG. 8, where valve 64 is a rotary type having a central cylinder 70 with feed-through conduits which align with the input and output ports of valve 64 when in an open position. Tubes 23 are shown connected to the output ports while tubes 74 or other ink conduits are shown connected to the input ports and to an ink supply station. The flow of ink is shown by arrow 75. A lubricated seal 76 is provided between the central cylinder 70 and the outer body of valve 64.

FIG. 11B illustrates valve 64 in its closed position by the rotation of cylinder 70 connected to motor shaft 65. As seen, the ink passage between the input and output ports is blocked by the central cylinder 70.

Other valves may also be used.

Figure 12:
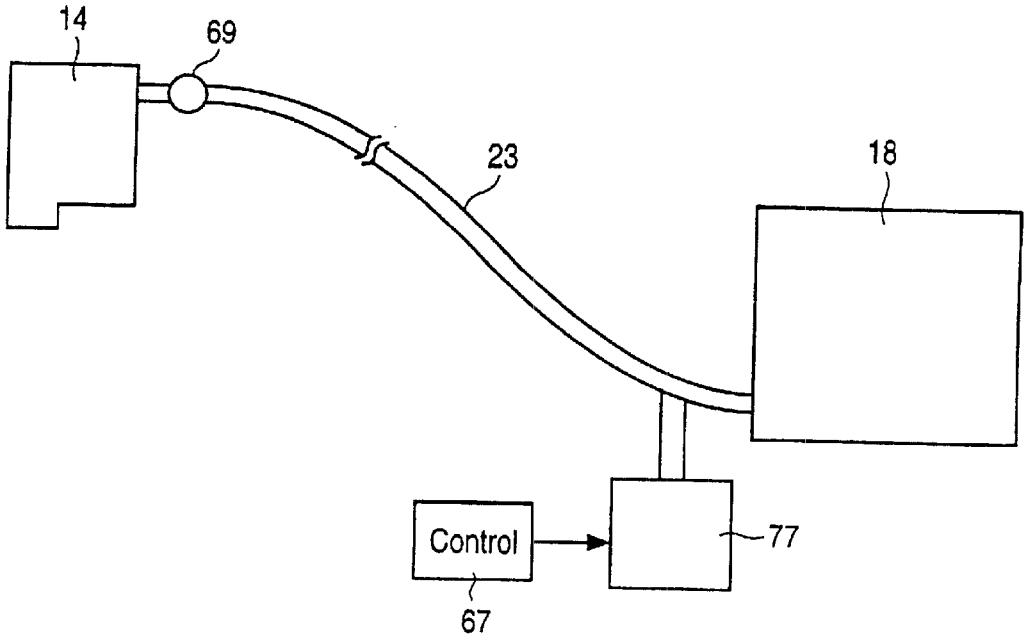
FIG. 12 illustrates an ink printer embodiment which pressurizes the ink tubes using a pressure source.

FIG. 12 illustrates another embodiment of the invention where the tube(s) 23 is pressurized using a positive pressure source 77 when it is sensed by control circuit 67 that the printer is not being used. The pressure source 77 pressurizes tube 23 such that the partial pressure of air inside tube 23 approximately equals the outside air pressure, thus preventing air diffusion into tube 23. Pressure source 77 may take many forms. Pressure source 77 may be a piston, a bellows, or other suitable device. One suitable pressure source is described later with respect to FIGS. 14 and 15. The force provided by the piston or bellows may be provided by a constant spring force generated by a mechanical spring or a gas. A valve, controlled by control circuit 67, may couple pressure source 77 to tube 23 when the printer is off, or pressure source 77 may be selectively actuated by control circuit 67.

In another embodiment, the ink supply cartridge or the ink supply station 18 may sufficiently pressurize the ink with a constant pressure source, such as a spring-loaded ink bag, a piston, or a bellows, so that a separate pressure source and control circuit 67 are not needed.

A valve 69, forming either a regulator valve or a separate valve, between tube 23 and print cartridge 14 is used to prevent ink drooling from the printhead nozzles.

Figure 13:
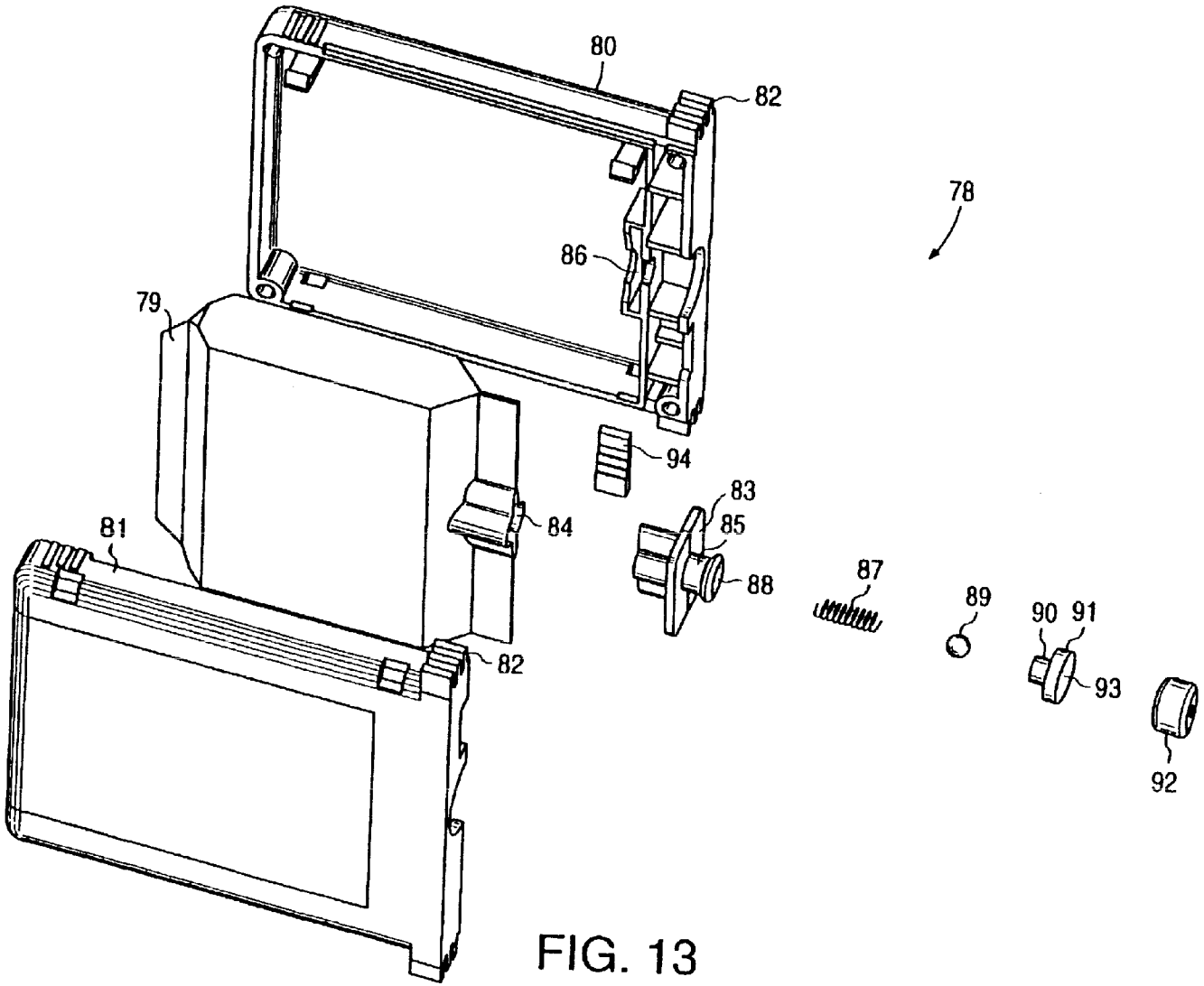
FIG. 13 is an exploded view of a non-pressurized ink supply cartridge.

FIG. 13 is an exploded view of a non-pressurized ink supply cartridge 78 such as shown in FIGS. 1 and 8. Such an ink supply cartridge 78 is simply removed from the ink supply station 18 (FIG. 8) and disposed of once its supply of ink has been depleted. The connection of such an ink supply cartridge 78 to the fluid interconnect has been described with respect to FIG. 8.

The non-pressurized ink supply cartridge 78 consists of a collapsible ink bag 79 and two rigid plastic housing members 80 and 81. Ink bag 79 may be formed of a flexible film such as Mylar or EVA, or a multi-layer film. One suitable film is the nine-layer film described in U.S. Pat. No. 5,450,112, assigned to the present assignee and incorporated herein by reference. The ends of ink bag 79 may be heat-staked or ultrasonically welded to housing member 80 or 81 to limit movement of ink bag 79.

Coded tabs 82 align with slots formed in the ink supply support to ensure the proper color ink supply cartridge is inserted into the correct stall of the ink supply support. In one embodiment, the ink supply support also latches onto tabs 82, using a spring-loaded latch, to secure cartridge 78 and to provide tactile feedback to the user that cartridge 78 is properly installed.

A plastic ink bag fitment 83 is partially inserted through an opening 84 in ink bag 79 and scaled with respect to opening 84 by glue or heat fusing. A poppet 85 extends from fitment 83. Bag fitment 83 is held firmly in place by a slot 86 formed in the plastic housing members 80 and 81.

A poppet spring 87 is inserted through a hole 88 in poppet 85 followed by a poppet ball 89. Ball 89 may be stainless steel or plastic.

An end 90 of a rubber septum 91 is then inserted into hole 88 in poppet 85. Septum 91 is then crimped and secured to poppet 85 using a crimped cap 92.

Septum 91 has a slit 93 formed through its center through which a hollow needle 60 (FIG. 8), in fluid connection with a tube 23, is inserted. Slit 93 in septum 91 is automatically urged closed by the resiliency of septum 91 when the needle 60 is removed.

Poppet spring 87 and poppet ball 89 serve to is provide added assurance that no ink will leak through slit 93 in septum 91 for short periods. When there is no needle inserted through slit 93, poppet spring 87 urges poppet ball 89 against the closed slit 93 so that ball 89 in conjunction with the closing of slit 93 provides a seal against ink leakage.

It is possible to design the fluid interconnect using a septum without the poppet, or a poppet without the septum. A septum without the poppet will reliably seal around a needle with a radial seal. However, when the ink supply with a septum has been installed in the printer for a long time, the septum will tend to take on a compression set. Upon removal, the septum may not completely reseal itself. If the supply is tipped or dropped, ink may leak out. A poppet valve (by itself) has the advantage (relative to a septum) of self-sealing without a compression set issue. However, it is less reliable in that it does not seal around the needle. Thus, to ensure a leak-tight fluid interconnection with the cartridge, some kind of face seal must be established. In addition, poppet valves vary in reliability when the surface they seal against is hard plastic—small imperfections in the sealing surface tend to lead to leaks. The combination of the septum/poppet valve overcomes these limitations by utilizing the advantages of both: the septum's very good sealing around the needle while eliminating the compression set issue. Additionally, the inside surface of the septum provides a compliant sealing surface for the poppet valve that is less sensitive to imperfections.

In the preferred embodiment, an integrated circuit sensor/memory 94 is permanently mounted to ink supply cartridge 78. This circuit provides a number of functions, including verifying insertion of the ink supply, providing indication of remaining ink in the supply, and providing a code to assure compatibility of the ink supply with the rest of the system.

In an alternate embodiment, ink bag 79 is provided with a positive pressure. This enables the tubes 36 connecting the ink supply to the print cartridges to be thinner and also allows the ink supply station to be located well below the print cartridges. To achieve a constant positive pressure, a spring may be used to urge the sides of ink bag 79 together to create a positive internal pressure. When using such a spring, ink bag 79 is provided with rigid side panels to distribute the spring force. Bow springs, spiral springs, foam, a gas, or other resilient devices may supply the spring force.

In another embodiment, ink bag 79 may be pressurized by an intermittent pressure source, such as a gas.

Figure 14:
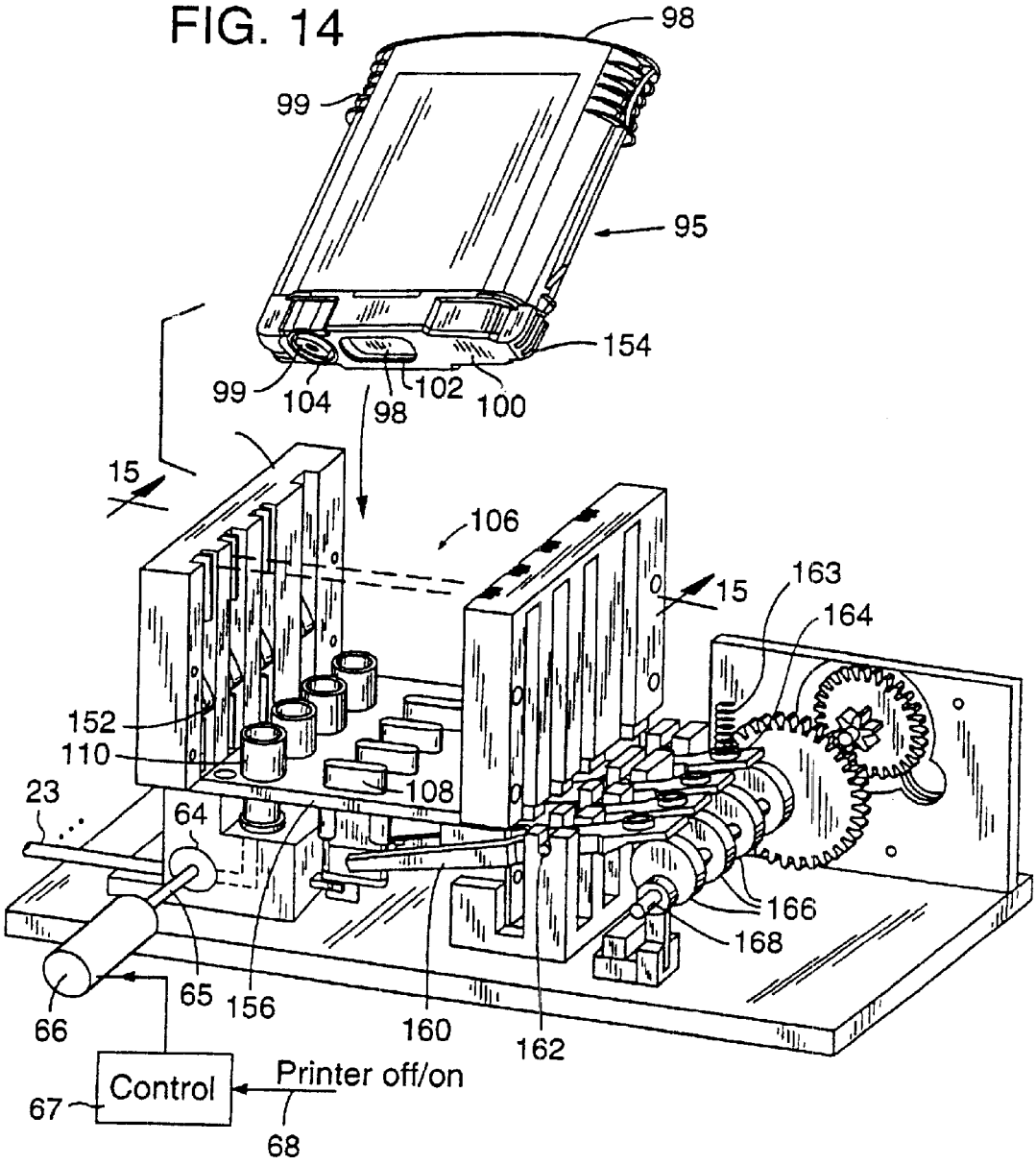
FIG. 14 shows an intermittently pressurized ink supply cartridge being inserted into a docking bay of an inkjet printer.
Figure 15:
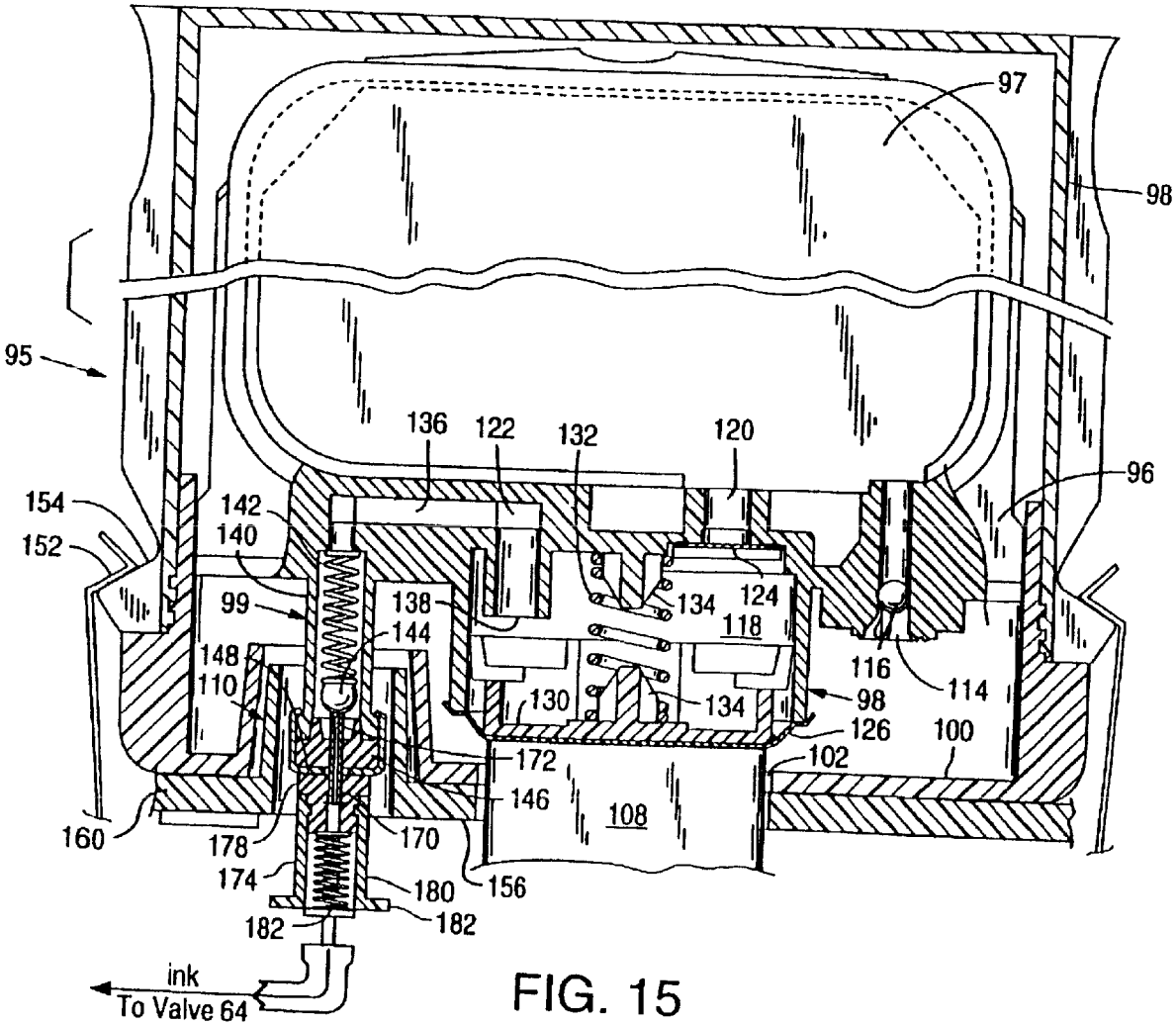
FIG. 15 is a cross-sectional view along line 15—15 in FIG. 14 showing the ink supply cartridge of FIG. 14 fully inserted into the docking bay.

FIGS. 14 and 15 illustrate an intermittently pressurized off-axis ink supply cartridge 95 and an apparatus for pressurizing the ink supply cartridge.

The ink supply cartridge 95 has a chassis 96 (FIG. 15) which carries an ink reservoir 97 for containing ink, a pump 98, and fluid outlet 99. The chassis 96 is enclosed within a hard protective shell 98 having a cap 100 affixed to its lower end. The cap 100 is provided with an aperture 102 to allow access to the pump 98 and an aperture 104 to allow access to the fluid outlet 99.

The ink supply cartridge 95 is inserted into a docking bay 106 of an ink-jet printer. Upon insertion of the ink supply cartridge 95, an actuator 108 within the docking bay 106 is brought into contact with the pump 98 through aperture 102. In addition, a fluid inlet 110 within the docking bay 106 is coupled to the fluid outlet 99 through aperture 104 to create a fluid path from the ink supply to the printer. Operation of the actuator 108 causes the pump 98 to draw ink from the reservoir 97 and supply the ink through the fluid outlet 99 and the fluid inlet 110 to the printer.

Upon depletion of the ink from the reservoir 97, or for any other reason, the ink supply cartridge 95 can be easily removed from the docking bay 106. Upon removal, the fluid outlet 99 and the fluid inlet 110 are closed to help prevent any residual ink from leaking into the printer or onto the user. The ink supply cartridge 95 may then be discarded or stored for reinstallation at a later time. In this manner, the present ink supply cartridge 95 provides a user of an ink-jet printer a simple, economical way to provide a reliable and easily replaceable supply of ink to an ink-jet printer.

The ink reservoir 97 is formed of a flexible plastic sheet to allow the volume of the reservoir to vary as ink is depleted from the reservoir. This helps to allow withdrawal and use of all of the ink within the reservoir by reducing the amount of back pressure created as ink is depleted from the reservoir. The illustrated ink supply cartridge 95 is intended to contain about 30 cubic centimeters of ink when full. Accordingly, the general dimensions of the ink reservoir defined by the frame are about 57 millimeters high, about 60 millimeters wide, and about 5.25 millimeters thick. These dimensions may vary depending on the desired size of the ink supply and the dimensions of the printer in which the ink supply is to be used.

The ink supply cartridge 95 is provided with a fill port 114 to allow ink to be initially introduced into the reservoir. After filling the reservoir, a plug 116 is inserted into the fill port 114 to prevent the escape of ink through the fill port. In the illustrated embodiment, the plug is a polypropylene ball that is press fit into the fill port.

The pump 98 serves to pump ink from the reservoir and supply it to the printer via the fluid outlet 99. As illustrated in FIG. 15, the pump 98 includes a pump chamber 118 that is integrally formed with the chassis 96.

A pump inlet 120 is formed at the top of the chamber 118 to allow fluid communication between the chamber 118 and the ink reservoir 97. A pump outlet 122 through which ink may be expelled from the chamber 118 is also provided. A valve 124 is positioned within the pump inlet 120. The valve 124 allows the flow of ink from the ink reservoir 97 into the chamber 118 but limits the flow of ink from the chamber 118 back into the ink reservoir 97. In this way, when the chamber is depressurized, ink may be drawn from the ink reservoir, through the pump inlet and into the chamber. When the chamber is pressurized, ink within the chamber may be expelled through the pump outlet.

In the illustrated embodiment, the valve 124 is a flapper valve positioned at the bottom of the pump inlet. The flapper valve 124 is a rectangular piece of flexible material. The valve 124 is positioned over the bottom of the pump inlet 120 and heat staked to the chassis 96 at the midpoints of its short sides. When the pressure within the chamber drops sufficiently below that in the reservoir, the unstaked sides of the valve each flex downward to allow the flow of ink around the valve 124, through the pump inlet 120 and into the chamber 110.

A flexible diaphragm 126 encloses the bottom of the chamber 118. The diaphragm 126 is slightly larger than the opening at the bottom of the chamber 118 and is sealed around the bottom edge of the chamber wall. The excess material in the oversized diaphragm allows the diaphragm to flex up and down to vary the volume within the chamber. In the illustrated ink supply, displacement of the diaphragm allows the volume of the chamber 118 to be varied by about 0.7 cubic centimeters. The fully expanded volume of the illustrated chamber 118 is between about 2.2 and 2.5 cubic centimeters.

A pressure plate 130 and a spring 132 are positioned within the chamber 118. The pressure plate 130 has a smooth lower face with a wall extending upward about its perimeter. The central region of the pressure plate 130 is shaped to receive the lower end of the spring 132 and is provided with a spring retaining spike 134.

The pressure plate 130 is positioned within the chamber 118 with the lower face adjacent the flexible diaphragm 126. The upper end of the spring 132, which is stainless steel in the illustrated embodiment, is retained on a spike 134 formed in the chassis and the lower end of the spring 132 is retained on the spike 134 on the pressure plate 130. In this manner, the spring biases the pressure plate downward against the diaphragm to increase the volume of the chamber. The sidewalls serve to stabilize the orientation of the pressure plate 130 while allowing for its free, piston-like movement within the chamber 118.

As illustrated in FIG. 15, a conduit 136 joins the pump outlet 138 to the fluid outlet 99. The fluid outlet 99 is housed within a hollow cylindrical boss 140 that extends downward from the chassis 96. The top of the boss 140 opens into the conduit 136 to allow ink to flow from the conduit into the fluid outlet. A spring 142 and sealing ball 144 are positioned within the boss 140 and are held in place by a compliant septum 146 and a crimp cover 148. The spring 142 is slightly compressed so that the spring 142 biases the sealing ball 144 against the septum 146 to form a seal. The crimp cover 148 fits over the septum 146 and engages an annular projection on the boss 140 to hold the entire assembly in place.

The sealing ball 144 is sized such that it can move freely within the boss 140 and allow the flow of ink around the ball when it is not in the sealing position.

The docking station 150, illustrated in FIG. 14, is intended for use with a color printer. Accordingly, it has four side-by-side docking bays 106, each of which can receive one ink supply cartridge 95 of a different color. The structure of the illustrated ink supply allows for a relatively narrow width. This allows for four ink supplies to be arranged side-by-side in a compact docking station without unduly increasing the footprint of the printer.

Each docking bay 106 includes opposing walls which define inwardly facing vertical channels. A leaf spring having an engagement prong 152 is positioned within the lower portion of each channel to latch onto the mating keys 154 formed on the ink supply cartridge 95. The mating keys in the channels of the other walls are different for each docking bay and identify the color of ink for use in that docking bay. A base plate 156 defines the bottom of each docking bay 106. The base plate 156 includes apertures which receive the actuator 108 and the fluid inlet 110.

The upper end of the actuator 108 extends upward through the base plate 156 and into the docking bay 106. The lower portion of the actuator 108 is positioned below the base plate and is pivotably coupled to one end of a lever 160 which is supported on pivot point 162. The other end of the lever 160 is biased downward by a compression spring 163 (only one spring is shown for simplicity) contacting spring support portion 164. In this manner, the force of the compression spring urges the actuator 108 upward. A cam 166 mounted on a rotatable shaft 168 is positioned such that rotation of the shaft to an engaged position causes the cam to overcome the force of the compression spring 163 and move the actuator 108 downward. Movement of the actuator causes the pump 98 to draw ink from the reservoir 97 and supply it through the fluid outlet 99 and the fluid inlet 110 to the printer.

A flag (not shown) extends downward from the bottom of the actuator 108 where it is received within an optical detector. The optical detector is of conventional construction and directs a beam of light toward a sensor. The optical detector is positioned such that when the actuator 108 is in its uppermost position, corresponding to the top of the pump stroke, the flag raises above the beam of light allowing it to reach the sensor and activate the detector. In any lower position, the flag blocks the beam of light and prevents it from reaching the sensor, and the detector is in a deactivated state. In this manner, the sensor can be used, as explained more fully below, to control the operation of the pump and to detect when an ink supply is empty.

The illustrated fluid inlet 110 (FIG. 15) includes an upwardly extending needle 170 having a closed, blunt upper end, a central bore and a lateral hole 172. A trailing tube 36, seen in FIG. 14, is connected to the lower end of the needle 170 via valve 64. Valve 64, motor 66, and control circuit 67 may be identical to that described with respect to FIGS. 8, 11A, and 11B. The trailing tube 23 leads to a printhead (not shown). There is a trailing tube 23 for each docking bay 106. In most printers, the printhead will usually include a small ink well for maintaining a small quantity of ink and some type of pressure regulator to maintain an appropriate pressure within the ink well. Typically, it is desired that the pressure within the ink well be slightly less than ambient. This back pressure helps to prevent ink from dripping from the printhead. The pressure regulator at the printhead may commonly include a check valve which prevents the return flow of ink from the printhead and into the trailing tube.

A sliding collar 174 surrounds the needle 170 and is biased upwardly by a spring 176. The sliding collar 174 has a compliant sealing portion 178 with an inner surface in direct contact with the needle 170. In addition, the illustrated sliding collar includes a substantially rigid portion 180 extending downwardly to partially house the spring 176. An annular stop 182 extends outward from the lower edge of the substantially rigid portion 180. The annular stop 182 abuts the base plate 156 to limit upward travel of the sliding collar 174 and define an upper position of the sliding collar on the needle 170. In the upper position, the lateral hole 172 is surrounded by the sealing portion 178 of the collar to seal the lateral hole, and the blunt end of the needle 170 is generally even with the upper surface of the collar.

The fluid interconnect between the ink supply station 18 in FIG. 8 and an ink supply cartridge 20–22 may be identical to that described above.

When the ink supply cartridge 95 is inserted into the docking bay 106, the actuator 108 enters through the aperture 102 in the cap 100 and into position to operate the pump 98. When the flexible diaphragm 126 is in its lowermost position, the volume of the chamber 118 is at its maximum, and a flag extending from the bottom of the actuator 108 is blocking the light beam from a sensor. The actuator 108 is pressed against the diaphragm 126 by the compression spring 163 pushing down on the spring support portion 164 to urge the chamber to a reduced volume and create pressure within the pump chamber 118. As the valve 124 limits the flow of ink from the chamber back into the reservoir, the ink passes from the chamber through the pump outlet 122 and the conduit 136 to the fluid outlet 99. The compression spring 163 is chosen so as to create a pressure of about 1.5 pounds per square inch within the chamber. Of course, the desired pressure may vary depending on the requirements of a particular printer and may vary throughout the pump stroke. For example, in the illustrated embodiment, the pressure within the chamber will vary from about 90–45 inches of water column during the pump stroke.

As ink is depleted from the pump chamber 118, the compression spring 163 continues to press the actuator 108 upward against the diaphragm 126 to maintain a pressure within the pump chamber 118. This causes the diaphragm to move upward to an intermediate position decreasing the volume of the chamber. In the intermediate position, the flag continues to block the beam of light from reaching the sensor in the optical detector.

As still more ink is depleted from the pump chamber 118, the diaphragm 126 is pressed to its uppermost position. In the uppermost position, the volume of the chamber 118 is at its minimum operational volume and the flag rises high enough to allow the light beam to reach the sensor and activate the optical detector.

A printer control system (not shown) detects activation of the optical detector and begins a refresh cycle. During the refresh cycle the cam 166 is rotated into engagement with the lever 160 to compress the compression spring and move the actuator 108 to its lowermost position. In this position, the actuator 108 does not contact the diaphragm 126.

With the actuator 108 no longer pressing against the diaphragm 126, the pump spring 132 biases the pressure plate 130 and diaphragm 126 outward, expanding the volume and decreasing the pressure within the chamber 118. The decreased pressure within the chamber 118 allows the valve 124 to open and draws ink from the reservoir 97 into the chamber 118 to refresh the pump 98. The check valve at the printhead, the flow resistance within the trailing tube 23, or both will limit ink from returning to the chamber 118 through the conduit 136. Alternatively, a check valve may be provided at the outlet port 99, or at some other location, to prevent the return of ink through the outlet port 99 and into the chamber 118.

After a predetermined amount of time has elapsed, the refresh cycle is concluded by rotating the cam 166 back into its disengaged position.

It should be appreciated that a mechanical switch, an electrical switch or some other switch capable of detecting the position of the actuator could be used in place of the optical detector.

The configuration of the present ink supply is particularly advantageous because only the relatively small amount of ink within the chamber is pressurized. The large majority of the ink is maintained within the reservoir at approximately ambient pressure. Thus, it is less likely to leak and, in the event of a leak, can be more easily contained.

The illustrated diaphragm pump has proven to be very reliable and well suited for use in the ink supply. However, other types of pumps may also be used. For example, a piston pump, a bellows pump, or other types of pumps might be adapted for use.

Additional detail of the intermittently pressurized ink supply is described in U.S. application Ser. No. 08/566,821, filed Dec. 4, 1995, entitled "Self-Sealing Fluid Interconnect With Double Sealing Septum," by John Barinaga et al., attorney docket no. 10951185, incorporated herein by reference.

Constant pressurization of the various ink supply cartridges described has the following advantages over intermittent pressurization:

(1) Lower product cost/minimum product complexity by eliminating any pump station, (2) Pressurizing the tubes reduces or eliminates air diffusion into tubes (depending on pressure level).

Intermittent pressurization has the following advantages over constant pressurization:

(1) Fluid seals and valves do not have to withstand constant pressure, resulting in improved reliability;

(2) Ink supplies are less expensive, since the plastic shell does not need to be as strong.

In an alternate embodiment of the present invention, the pump actuator 108 and the control mechanism of the docking station 150 are enabled even while the printer is not being used in order to pressurize tube 23 to prevent air ingestion. This constant pressure may obviate the need for valve 64 in FIG. 8.

Conclusion

Multiple embodiments of an ink delivery system for an ink printer have been described which include an off-axis ink supply, a valve (or other tube pressurizer) actuated based upon the use or non-use of the printer, and tubes leading from the valve to a scanning print cartridge. Incorporation of the valve or other tube pressurizer improves the reliability of the printer after long periods of non-use and enables the use of thinner and more flexible tubes, since air diffusion through the tubes is less of a concern.

While particular embodiments of the present invention have been shown and described, it will be obvious to those skilled in the art that changes and modifications may be made within departing from this invention in its broader aspects and, therefore, the appended claims are to encompass within their scope all such changes and modifications as fall within the true spirit and scope of this invention.

What is claimed is:

1. A printing system comprising:

an ink source containing ink;

a scanning carriage;

[a] *at least one* print cartridge supported by said scanning carriage;

[a] *at least one* flexible tube having a first end connected to said print cartridge for supplying said ink from said ink source to said print cartridge, said flexible tube having a second end;

a valve connected between an ink chamber in said print cartridge and said first end of said flexible tube for automatically sealing, in a closed position, said flexible tube from said ink chamber at least during periods when said at least one print cartridge is not printing; and a means, connected to said second end of said flexible tube, for pressurizing said flexible tube for preventing a partial pressure of gas mixture within said tube from falling substantially below ambient pressure for a substantial amount of time during said periods when said at least one print cartridge is not printing so as to limit expansion of any bubbles within said tube, said flexible tube between said valve and said means for pressurizing providing a direct path between said valve and said means for pressurizing through said flexible tube.

2. The system of claim 1 wherein said valve is a first valve, and said means for pressurizing comprises:

a second valve connected between said ink source and said at least one flexible tube for automatically sealing, in a closed position, said at least one flexible tube from said ink source during said periods when said at least one print cartridge is not printing and providing a fluid coupling, in an open position, between said at least one flexible tube and said ink source during periods when said at least one print cartridge is printing.

3. The system of claim 1 wherein said ink source comprises:

an ink supply station having a first fluid interconnect member in fluid communication with said means for pressurizing; and at least one replaceable ink supply cartridge contained within said ink supply station and having an ink reservoir and a second fluid interconnect member in fluid communication with said ink reservoir for forming an airtight fluid connection to said first fluid interconnect member when said ink supply cartridge is installed in said ink supply station, said second fluid interconnect member comprising a resilient septum having a self-sealing central hole.

4. The system of claim 3 wherein said second fluid interconnect member further comprises:

a spring-loaded stopper which is urged against said central hole in said septum when said ink supply cartridge is not installed in said ink supply station to form an additional seal of said hole to help prevent ink leakage from said hole.

5. The system of claim 4 wherein said spring-loaded stopper comprises a ball and a spiral spring for urging said ball against said hole when said ink supply cartridge is not installed in said ink supply station.

6. The system of claim 1 further comprising an ink pressure regulator within said print cartridge and connected to said ink chamber, said pressure regulator controlling a flow of ink from said ink source into said ink chamber, wherein said valve forms part of said ink pressure regulator.

7. The system of claim 1 wherein said ink source contains said ink at ambient pressure.

8. The system of claim 1 further comprising:

a controller, connected to said means for pressurizing connected to said at least one flexible tube, for actuating said means for pressurizing during said periods when said at least one print cartridge is not printing.

9. The system of claim 8 wherein said controller detects an on/off power signal and, in response, actuates said means for pressurizing.

10. The system of claim 1 wherein said at least one flexible tube comprises Polyvinylidene Chloride (PVDC).

11. The system of claim 1 wherein said means for pressurizing is electrically actuated.

12. A method of operating a printing system, said printing system including an ink source containing ink, a scanning carriage, [a] *at least one* print cartridge supported by said scanning carriage, an ink chamber in said print cartridge, [a] *at least one* flexible tube fluidically coupled to said ink source and said print cartridge for supplying said ink from said ink source to said print cartridge, a means, connected to said flexible tube, for preventing a partial pressure of gas within said tube from falling substantially below ambient pressure during periods when said print cartridge is not printing, and a valve connected between said ink chamber and said flexible tube, said flexible tube between said means for preventing and said valve providing a direct path between said means for preventing and said valve through said flexible tube, said method comprising:

activating said valve so that said valve is in a closed position during at least periods when said print cartridge is not printing; and actuating said means for preventing a partial pressure of gas within said tube from falling substantially below ambient pressure during said periods when said print cartridge is not printing so as to limit expansion of any bubbles within said tube.

13. The method of claim 12, wherein said valve is a first valve and wherein said means for pressurizing comprises a second valve connected between said ink source and said at least one flexible tube, wherein said step of actuating comprises:

actuating said second valve into a closed position to seal said at least one flexible tube from said ink source during said periods when said at least one print cartridge is not printing; and actuating said second valve into an open position to provide a fluid coupling between said at least one flexible tube and said ink source during periods when said at least one print cartridge is printing.

14. The method of claim 13 further comprising the step of:

detecting a power on/off signal and, in response, performing said step of actuating said second valve into a closed position.

15. An inkjet printing system supported on a rigid frame, in which a print cartridge removably mounted on a carriage moves relative to said frame across a print zone to deposit ink on media, said print cartridge has a valve-actuated inlet connected with a tube for holding ink to be supplied to an ink chamber in said print cartridge, said inkjet printing system comprising:

an off-carriage ink reservoir having a base for being supported by said frame, and having a discharge port attached to said tube for fluid communication therewith; and ink contained in said reservoir which passes through said discharge port and into said tube for movement along an enclosed fluid path inside cylindrical walls of said tube and to said valve-actuated inlet, said valve-actuated inlet holding said ink in temporary storage inside of said tube during periods when said printhead is not printing and passing said ink into said printhead whenever a sufficient amount of said ink is deposited by said printhead on said media to deplete an amount of ink in said ink chamber;

means for limiting expansion of any bubbles within said ink in said tube, said means for limiting expansion pressurizing said ink above ambient pressure within said tube during periods when said printhead is not printing to prevent air from diffusing into said tube during said periods when said printhead is not printing, wherein said ink passes directly from said means for limiting expansion to said valve-actuated inlet along said enclosed fluid path of said tube.

16. The system of claim 15 wherein said means for limiting expansion of any bubbles comprises a supply valve located between said discharge port and a portion of said tube, wherein said ink is pressurized by actuation of said supply valve.

17. The system of claim 16 wherein said portion includes substantially an entire length of said tube.

18. A method of operating a printing system, said printing system including an ink source containing ink, a scanning carriage, [a] *at least one* print cartridge supported by said scanning carriage, and a flexible tube consisting of a first opening fluidically coupled to said ink source and a second opening fluidically coupled to said at least one print cartridge, said flexible tube having no other openings through which ink flows between said first opening and said second opening, said method comprising:

closing said first opening and said second opening during periods when said at least one print cartridge is not printing to seal said flexible tube to limit expansion of any bubbles in said flexible tube; and opening said first opening and said second opening during periods when said at least one print cartridge is printing.

*19. The system of claim 1 wherein said ink source comprises:*

*a replaceable ink supply for removable insertion into a docked position within a docking bay of an inkjet printer, said docking bay having a pump actuator and a fluid inlet coupled to a first valve for supplying ink to said print cartridge, said ink supply comprising:*

*a chassis;*

*an ink reservoir coupled to said chassis for containing a quantity of ink;*

*a fluid outlet carried on said chassis for engaging said fluid inlet when said ink supply is in said docked position; and*

*a pump carried on said chassis in fluid communication with said ink reservoir and said fluid outlet, said pump actuable by said actuator when said ink supply is in said docked position to draw ink from said ink reservoir and supply said ink through said fluid outlet to said flexible tube.*

*20. The system of claim 1, wherein the means for pressurizing is a pressure source that is in fluid communication with said at least one flexible tube when said printer is not being used.*

*21. The system in claim 20, wherein said pressure source is located inside said ink source containing ink.*

*22. The system in claim 21, wherein pressure from said pressure source is generated by a constant spring force.*

*23. The system in claim 22, wherein said spring force is provided by a gas within said ink source.*

*24. The system in claim 23, wherein said spring force is provided by a mechanical spring within said ink source.*

*25. The system of claim 1 wherein said ink source contains ink at a pressure greater than ambient pressure.*

*26. The system of claim 25 wherein said ink in said ink source is constantly under pressure provided by a constant spring force.*

*27. The system of claim 25 wherein said ink is intermittently subjected to pressure above said ambient pressure and, at other times, at approximately ambient pressure.*

*28. The system of claim 19 in which said pump comprises a variable volume chamber.*

*29. The system of claim 19 further comprising a second valve interposed between said pump and said ink reservoir, said second valve allowing the flow of ink from said ink reservoir into said pump and limiting the flow of ink from said pump into said ink reservoir.*

* * * * *